United States Patent
Weinreich et al.

(10) Patent No.: US 8,447,332 B2
(45) Date of Patent: May 21, 2013

(54) LOCATION-BASED SERVICES PLATFORM

(75) Inventors: Andrew P. Weinreich, New York, NY (US); Jeremy E. Levy, New York, NY (US); Gilbert Barron, South Salem, NY (US)

(73) Assignee: Xtify, Inc., New York, NY (US)

( * ) Notice: Subject to any disclaimer, the term of this patent is extended or adjusted under 35 U.S.C. 154(b) by 444 days.

(21) Appl. No.: 12/434,508

(22) Filed: May 1, 2009

(65) Prior Publication Data

US 2009/0275348 A1 Nov. 5, 2009

Related U.S. Application Data

(60) Provisional application No. 61/050,180, filed on May 2, 2008.

(51) Int. Cl.
*H04W 24/00* (2009.01)

(52) U.S. Cl.
USPC .............. 455/456.3; 455/414.3; 455/411; 455/432.3; 455/456.1; 455/456.5; 370/338

(58) Field of Classification Search
USPC ....................................................... 455/456.3
See application file for complete search history.

(56) References Cited

U.S. PATENT DOCUMENTS

| | | | |
|---|---|---|---|
| 6,549,768 B1 | 4/2003 | Fraccaroli | |
| 6,773,344 B1 | 8/2004 | Gabai et al. | |
| 6,804,707 B1 | 10/2004 | Ronning | |
| 6,912,395 B2 * | 6/2005 | Benes et al. | ............... 455/456.1 |
| 7,499,950 B2 | 3/2009 | Draluk et al. | |
| 2004/0143661 A1 * | 7/2004 | Higashi et al. | ................ 709/224 |
| 2005/0232189 A1 * | 10/2005 | Loushine | ....................... 370/328 |
| 2005/0239447 A1 * | 10/2005 | Holzman et al. | ........... 455/414.3 |
| 2005/0250552 A1 | 11/2005 | Eagle et al. | |
| 2006/0168651 A1 * | 7/2006 | Araki et al. | ....................... 726/6 |
| 2007/0015519 A1 * | 1/2007 | Casey | ......................... 455/456.2 |
| 2007/0030824 A1 | 2/2007 | Ribaudo et al. | |
| 2007/0100981 A1 | 5/2007 | Adamczyk et al. | |
| 2007/0162569 A1 | 7/2007 | Robinson et al. | |
| 2007/0189276 A1 * | 8/2007 | Bennett | ......................... 370/356 |
| 2007/0264968 A1 * | 11/2007 | Frank et al. | ................ 455/404.2 |

(Continued)

OTHER PUBLICATIONS

Eagle, N. et al., "Mobile Matchmaking: Proximity Sensing and Cueing," MIT Media Laboratory Technical Note 580, May 2004, 15 pages.

(Continued)

*Primary Examiner* — Kent Chang
*Assistant Examiner* — Benjamin Morales Fernandez
(74) *Attorney, Agent, or Firm* — Fenwick & West LLP

(57) ABSTRACT

A platform for providing location-based services is disclosed. A location data collection client running on a mobile device periodically obtains data allowing determination of the geographic location of the mobile device (e.g., GPS, cell tower, or WiFi data) and transmits that data and mobile device-specific information to a location-based services (LBS) platform server. The LBS platform server determines geographic location of the mobile device from the received data. For example, the LBS platform server accesses databases associating latitude and longitude coordinates with cell tower data or WiFi data and updates mobile device location to maintain current location information for the mobile device, which can be used as a proxy for the location of a mobile device user. The LBS platform server further includes a set of APIs allowing third-party services providers to access to the location data.

15 Claims, 4 Drawing Sheets

U.S. PATENT DOCUMENTS

| | | | |
|---|---|---|---|
| 2008/0026774 A1 | 1/2008 | Fraccaroli | |
| 2008/0056215 A1 | 3/2008 | Kopikare et al. | |
| 2008/0062940 A1* | 3/2008 | Othmer et al. | 370/338 |
| 2008/0070550 A1 | 3/2008 | Hose | |
| 2008/0086261 A1 | 4/2008 | Robinson et al. | |
| 2008/0133716 A1* | 6/2008 | Rao et al. | 709/220 |
| 2008/0171559 A1* | 7/2008 | Frank et al. | 455/456.5 |
| 2008/0248815 A1* | 10/2008 | Busch | 455/456.5 |

OTHER PUBLICATIONS

Eagle, N. et al., "Social Serendipity: Mobilizing Social Software," Pervasive Computing, IEEE, Apr.-Jun. 2005, pp. 28-34.

"MobiLuck," 2008, MobiLuck, 3 pages, [Online] [Retrieved on Apr. 2, 2009] Retrieved from the Internet<URL:http://www.mobiluck.com/en/>.

Pietilainen, A-K. et al., "Experiments in Mobile Social Networking," Thomson Technical Report, No. CR-PRL-2008-02-0003, Feb. 7, 2008, 15 pages.

PCT International Search Report and Written Opinion, PCT Application No. PCT/US2009/042628, Jul. 6, 2009, 8 pages.

"Social Navigation—Windows Mobile Navigation—Navmii is Launched in the UK," WordPress, 3 pages, Nov. 21, 2008, [Online] [Retrieved on Mar. 2, 2009] Retrieved from the Internet<URL:http://www.root.karputer.co.uk/blog/blog/index.php>.

Steinfield, C., "The Development of Location Based Services in Mobile Commerce," 2004, 15 pages, Elife after the dot.com bust, Springer Verlag, Berlin.

* cited by examiner

LOCATION-BASED SERVICES PLATFORM

CROSS REFERENCE TO RELATED APPLICATIONS

This application claims the benefit of U.S. Provisional Application No. 61/050,180, filed May 2, 2008, which is incorporated by reference in its entirety.

BACKGROUND

This invention relates generally to location-based services, and more particularly to a platform providing location data to third-party service providers.

Location-based services (LBS) make use of the geographical location of a mobile device, such as a mobile phone, to provide the mobile device with data relevant to the mobile device's geographical location. Providing LBS allows a third-party service provider or wireless service operator to deliver customized content to mobile devices. Data supplied via LBS may identify an entity, such as a person, business or other object that is near the geographic location of the mobile device, providing a mobile device user with data about the surrounding area. Additionally, LBS could allow movement of a mobile device over time to be tracked or transmission of information, such as notifications, alerts or coupons, to the mobile device when it is geographically near a specified location. The tracking of a device is generally used as a proxy to track a person or asset.

The location data determining mobile device geographic location may be obtained using various methods and maintained in different formats. Because of this, different wireless operators and third-party service providers differently calculate and maintain mobile device geographic location data. Additionally, privacy considerations regarding mobile device geographic location data may be affected by contracts, regulations or policies specific to different wireless carriers. Accordingly, mobile device geographic location data is generally separately calculated and maintained by different wireless carriers, requiring third-party service providers offering LBS applications to develop separate applications specific to different wireless carriers. This need to separately develop and maintain wireless carrier-specific applications hinders the development and adoption of LBS applications offered by third-party providers. Further because wireless operators generally do not provide location to Providers, Providers generally need to build location based applications in the form of software downloadable to the mobile device or through proprietary hardware. Providers must generally choose between using Location Data provided by wireless operators or Location Data extracted from the mobile device.

SUMMARY

Embodiments of the invention relate to a platform for providing location-based services. A location data collection client running on a mobile device periodically obtains data allowing determination of the geographic location of the mobile device (e.g., GPS, cell tower, or WiFi data) and transmits that data and mobile device-specific information to a location-based services (LBS) platform server. The LBS platform server determines geographic location of the mobile device from the received data. For example the LBS platform server accesses databases relating geographic locations to cell tower data or WiFi data (e.g., by the MAC addresses of access points) and identifies latitude and longitude coordinates associated with the cell tower data or WiFi data. In an embodiment, the LBS platform server may also receive data allowing determination of the geographic location of the mobile device from additional sources, such as a hardware device or a wireless operator. The LBS platform server updates mobile device location to maintain current location information for the mobile device, which can be used as a proxy for the location of a mobile device user. The LBS platform server further includes a set of APIs allowing third-party service providers to access to the location data. Various applications are enabled by this platform, including pull models where third-party services poll the location data and push models where the server sends the location data according to predefined algorithms.

For example, an API stored on the LBS platform server allows a third-party service provider to retrieve a mobile device location from the LBS platform server in response to a data request or to determine other mobile devices or locations within a certain radius of the retrieved mobile device location. Another API stored on the LBS platform server allows the LBS platform server to push mobile device location to a third-party service provider when mobile device movement meets parameters specified by the third-party service provider or when the mobile device location is within a specified radius of another mobile device or specified location. In an embodiment, a third-party service provider may provide customized location logic to specify when mobile device location is transmitted from the LBS platform server to the third-party service provider. Additionally, the stored APIs may also include presentation or formatting layer, to simplify distribution of content or other data from the third-party content provider.

The Figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Location-Based Services Platform Architecture

Figure 1:
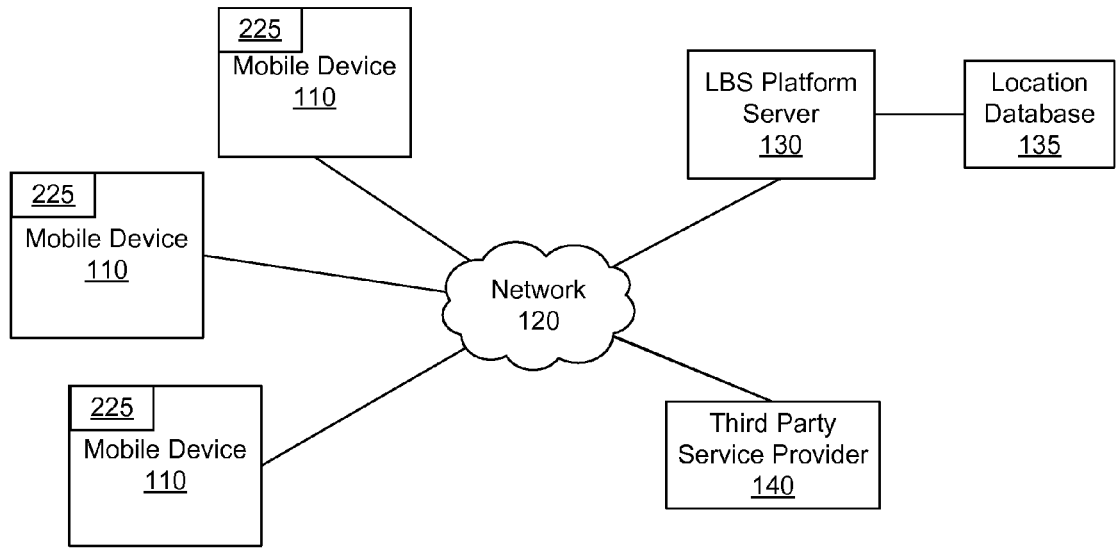
FIG. 1 is a high-level block diagram of a system environment for a platform providing location-based services invention, in accordance with an embodiment of the invention.

Embodiments of the invention may be implemented using various architectures, such as the example architecture illustrated in FIG. 1. In this embodiment, location-based services (LBS) platform comprises one or more mobile devices 110, a network 120, a location-based platform (LBS) server 130 and a third-party service provider 140. The LBS platform may also include a location database 135. While FIG. 1 depicts a single third-party service provider 140, in other embodiments multiple third-party service provides 140 are included in the LBS platform.

The one or more mobile devices 110 include onboard processing capabilities and data communication capabilities, such as Bluetooth, WiFi, RF, infrared and ultrasonic sound, as well as input/output functionalities. For example, a mobile device 110 comprises a mobile phone, a personal digital assistant, a smart phone, a navigation device or a laptop computer. However, a mobile device 110 may be any device capable of processing data and communicating data that can be moved between geographic locations, such as a watch or a car. The mobile device 110 also receives input from a user and presents output to the user. A mobile device 110 is described in more detail below in conjunction with FIG. 2. As further described in conjunction with FIG. 2, the one or more mobile devices 110 include a location data collection client 225 which extracts data from the mobile device. The extracted data may comprise global positioning system (GPS) data describing the latitude and longitude of the mobile device 110, cell-tower data identifying one or more cell towers that are geographically nearest to the mobile device 110 or data identifying one or more wireless access points geographically nearest to the mobile device 110. In one configuration the location data collection 225 extracts data from a location API executing on the mobile device 110 obtaining GPS data and/or additional location data from the mobile device 110. In an embodiment, the location data collection client 225 also extracts data specific to the mobile device 110, such as a device type, a timestamp when data was extracted or an International Mobile Equipment Identity (IMEI) number or other product key, such as IMEA number.

The network 120, which may comprise any combination of local area and/or wide area networks using wireless communication systems, communicates data between the one or more mobile devices 110, the LBS platform server 130 and/or the third-party service provider 140. In an embodiment, the network 120 uses a combination of wireless and wired communication systems to communicate data. To communicate data between the one or more mobile devices 110, the LBS platform server 130 and/or the third-party service provider 140, the network 120 may employ a secure web service using Hypertext Transfer Protocol (HTTP) and/or Hypertext Transfer Protocol over Secure Socket Layer (HTTPS). Alternatively, the network 120 may use the Transmission Control Protocol (TCP) for data communication.

The LBS platform server 130 communicates with the one or more mobile devices 110 and/or the third-party service provider 140 via the network 120. The LBS platform server 120 receives data from a location data collection client 225 running on a mobile device 110 and processes the received data to determine the geographic location of the mobile device 110 or extract data associated with the mobile device 110, such as device type or timestamp associated with data extraction. In an embodiment, the LBS platform server 130 communicates with a location database 135 which determines mobile device 110 geographic location from a location data collection client 225.

For example, the location data collection client 225 extracts data identifying one or more cell towers geographically closest to the mobile device 110. The data identifying the one or more cell towers is received by the LBS platform server 130, which communicates the data identifying the one or more cell towers to the location database 135 including latitude and longitude coordinates associated with various cell towers. The latitude and longitude coordinates of the one or more cell towers identified by the location data collection client 225 are transmitted from the location database 135 to the LBS platform server 130 to identify the current position of the mobile device 110. In an embodiment, the LBS platform server 130 or the location database 135 may use a reverse geo-coder to convert the latitude and longitude coordinates of the identified one or more cell towers as a street address, a city, a zip code or a country.

As another example, the location data collection client 225 extracts data identifying one or more wireless access point geographically closest to the mobile device 110. The data identifying the cell towers is received by the LBS platform server 130, which communicates the data identifying the one or more wireless access points to the location database 135 including latitude and longitude coordinates associated with various wireless access points. The latitude and longitude coordinates of the one or more wireless access points identified by the location data collection client 225 are transmitted from the location database 135 to the LBS platform server 130 to identify the current position of the mobile device 110. In an embodiment, the LBS platform server 130 or the location database 135 may use a reverse geo-coder to convert the latitude and longitude coordinates of the identified one or more wireless access points as a street address, a city, a zip code or a country.

Although shown in FIG. 1 as separate from the LBS platform server 130, in other embodiments, the location data base 135 is included in the LBS platform server 130 to allow local determination of mobile device 110 geographic location. For example, the LBS platform server 130 includes one or more databases associating latitude and longitude coordinates with various wireless access points or associating latitude and longitude coordinates with various cell towers.

As further described below in conjunction with FIG. 3, the LBS platform server 130 include one or more application programming interfaces (APIs) to allow integration of applications with the LBS platform server 130. The one or more APIs allow a third-party service provider 140 to access geographic locations of one or more mobile devices 110 from the LBS platform server 130, enabling the third-party service provider 140 to provide a mobile device 110 with content customized according to the geographic position of the mobile device 110. Privacy settings stored by the LBS platform server 130 may be used to regulate data about a mobile device 110 provided to the third-party service provider 140 by an API.

Figure 2:
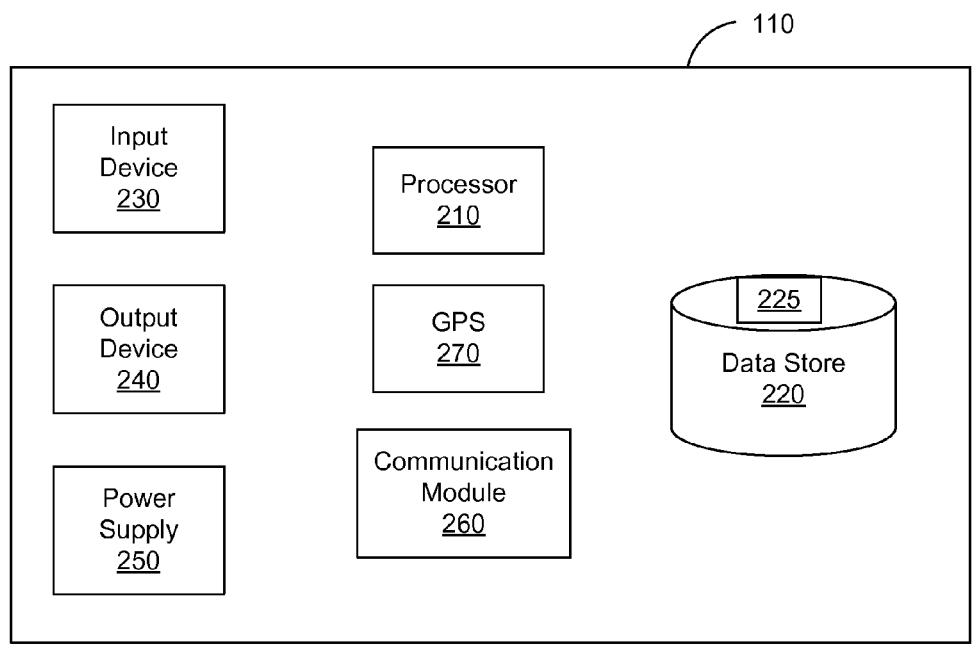
FIG. 2 is a block diagram of a mobile device in accordance with an embodiment of the invention.

FIG. 2 illustrates an embodiment of a mobile device 110 for use in a location-based service (LBS) platform, such as the embodiments described above. In the embodiment shown in FIG. 2, the mobile device 110 comprises a processor 210, a data store 220, an input device 230, an output device 240, a power supply 250, a communication module 260 and a Global Positioning System (GPS) module 270. It should be understood, however, that not all of the above components are required for the mobile device 110, and this is not an exhaustive list of components for all embodiments of the mobile device 110 or of all possible variations of the above components. A mobile device 110 may have any combination of fewer than all of the capabilities and components described herein.

The processor 210, data store 220, and the power supply 250, such as a battery or any other suitable power source enable the mobile device 110 to perform computing functionalities. The processor 210 is coupled to the input device 230 and the output device 240 enabling applications running on the smart pen 100 to use these devices. In one embodiment, the data store 220 comprises a small amount of random access memory (RAM) and a larger amount of flash or other persistent memory, allowing applications, such as the location data collection client 225, to be stored and executed by the mobile device 110. This allows the location data collection client 225 to extract data from the mobile device 110 describing geographic location of the mobile device. The mobile device also executes an operating system or other software supporting one or more input modalities, for receiving input from the input device 230 and/or one or more output modalities presenting data via the output device 240, such as audio playback or display of visual data.

The output device 240 may comprise any suitable display system for providing visual feedback, such as an organic light emitting diode (OLED) display. The output device 240 may also include a speaker or other audio playback device to provide auditory feedback. For example, the output device 240 may communicate audio feedback (e.g., prompts, commands, and system status) according to an application running on mobile device 110 using the speaker and also display word phrases, static or dynamic images, or prompts as directed by the application using the display. The input device 240 comprises any suitable device for receiving input from a user, such as a keyboard, touch-sensitive display or gesture capture system.

The communication module 260 comprises a wireless communication circuit allowing wireless communication with the network 120 (e.g., via Bluetooth, WiFi, RF, infrared, or ultrasonic). For example, the communication module 260 identifies and communicates with one or more wireless access points using WiFi or identifies and communicates with one or more cell towers using RF. In an embodiment, the communication module 260 also includes a jack for receiving a data cable (e.g., Mini-USB or Micro-USB). The GPS module 270 determines geographic location of the mobile device 110 by timing signals received from GPS satellites to calculate distance from the GPS module 270 and each GPS satellites.

Figure 6:
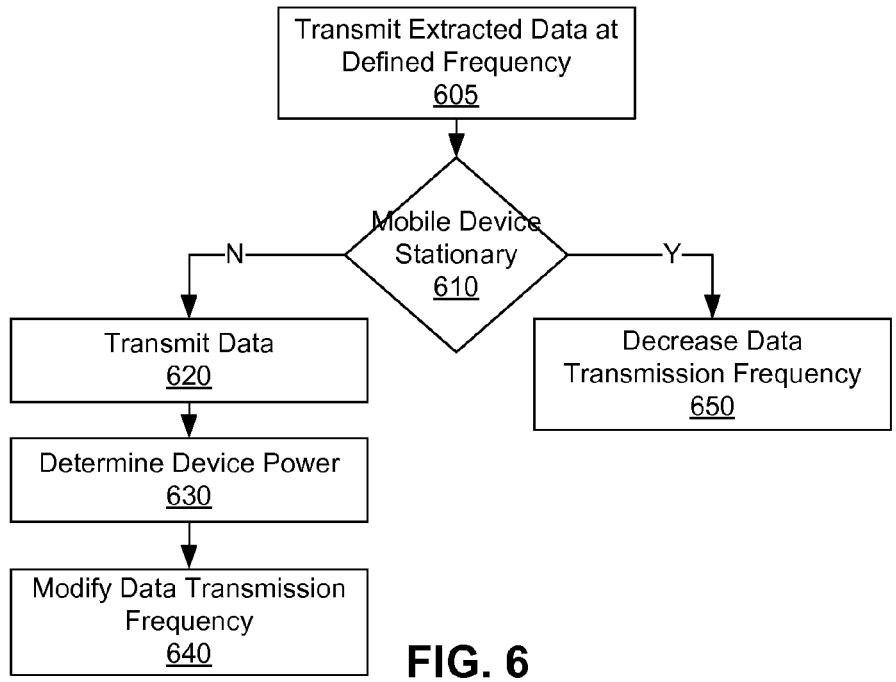
FIG. 6 is a flow chart of a method for updating data describing the geographic location of a mobile device in accordance with an embodiment of the invention.

The location data collection client 225 extracts data from the GPS module 270 identifying the geographic location of the GPS module 270 to identify the location of the mobile device 110. Additionally, the location data collection client 225 extracts data from the communication module 260 identifying one or more cell towers and/or wireless access points geographically near the mobile device 260. Data extracted by the location data collection client 225 is transmitted via the communication module 260 to a LBS platform server 130 at predefined intervals. For example, at five-minute intervals, the location data collection client 225 transmits data to the LBS platform server 130 using the communication module 260. In an embodiment, the frequency at which the location data collection client 225 transmits data to the LBS platform server is increased or decreased based on different parameters, such as amount of movement by the mobile device 110, network usage, a specified maximum delay interval or use of mobile device 110 hardware. For example, if the power supply 250 operates at less than half of full capacity, the frequency of data transmission by the location data collection client 225 is decreased. FIG. 6, further described below, illustrates an example method for modifying the frequency of data transmission by the location data collection client 225 responsive to power supply 250 life.

Figure 3:
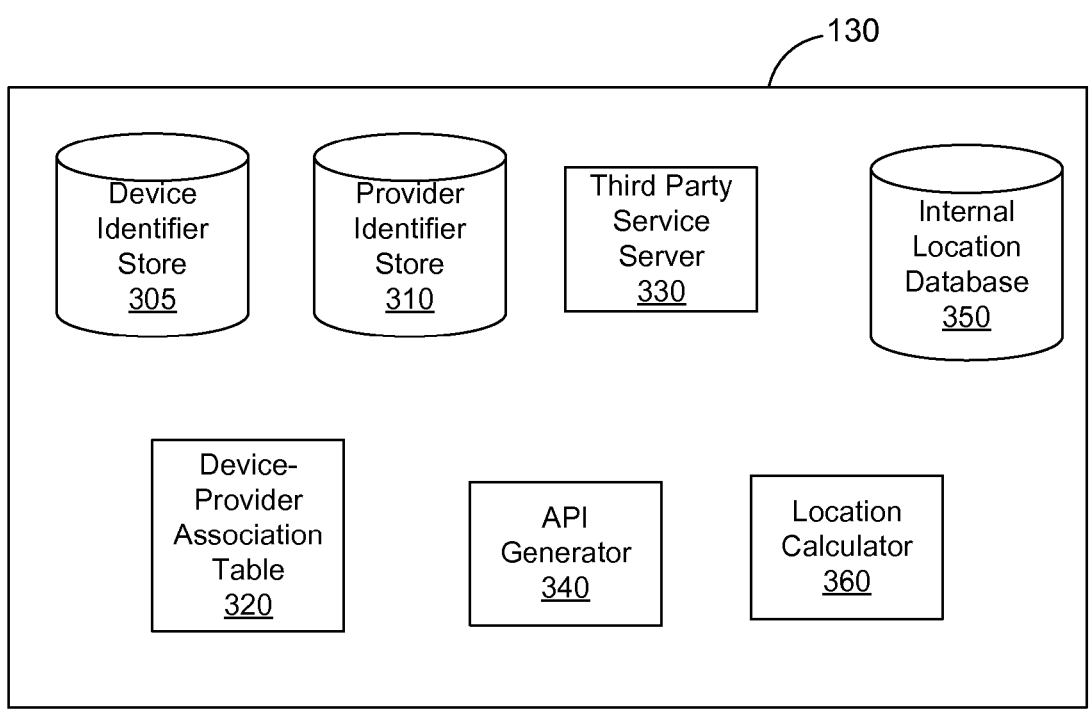
FIG. 3 is a diagram of a location-based platform server in accordance with an embodiment of the invention.

FIG. 3 illustrates a block diagram of an embodiment of a LBS platform server 130 for use in a location-based service (LBS) platform, such as the embodiments described above. In the embodiment shown in FIG. 3, the LBS platform server 130 comprises a device identifier store 305, a provider identifier store 310, a device-provider association table 320, a third-party service server 330, an API generator 340, an internal location database 350 and a location calculator 360. It should be understood, however, that not all of the above components are required for the LBS platform server 130, and this is not an exhaustive list of components for all embodiments of the LBS platform server 130 or of all possible variations of the above components. A LBS platform server 130 may have any combination of fewer than all of the capabilities and components described herein.

The device identifier store 305 is a persistent storage device including one or more device identifiers. As used herein, a "device identifier" refers to a combination of a client identifier associated with a location data collection client 225 running on a mobile device 110 and a mobile device identifier, such as a serial number, IDMA number or other identifier associated with the mobile device. A device identifier is associated with a mobile device 110 running the location data collection client 225 to uniquely identify the mobile device 110 by including a client identifier associated with the location data collection client 225 and a mobile device identifier associated with the mobile device 110. For example, the client identifier is received by the mobile device 110 when the location data collection client 225 is installed, or when the location data collection client 225 is initially operated. This client identifier is combined with a mobile device identifier retrieved from the mobile device 110 by the location data collection client, and the client identifier and mobile device identifier are combined to generate the device identifier. In one embodiment, the device identifier store 305 restricts access to the device identifiers received from one or more mobile devices 110 running the location data collection client 225 to prevent entities other than the LBS platform server 130 from accessing the device identifiers. For example, third-party service providers 140 are prevented from accessing the device identifier store 305 to maintain the privacy of the identified mobile devices 110.

Similarly, the provider identifier store 310 is a persistent storage device including one or more provider identifiers that uniquely identify third-party service providers 140. When a third-party service provider 140 desires to provide an application or other content at least partially dependent on the geographic location of a mobile device 110, the provider identifier store 310 generates and stores a provider identifier uniquely identifying the third-party service provider 140. The generated provider identifier is also transmitted to the third-party service provider 140 and used to later request data from the LBS platform server 130. Maintaining separate provider identifiers and device identifiers allows the LBS platform server 130 to preserve the privacy of different mobile devices 110 while allowing a third-party service provider 140 to receive at least a subset of data associated with mobile devices 110.

Additionally, the third-party service provider 140 may also locally store and maintain a user identifier associated with different users of mobile devices 110 that receive content from the third-party service provider 140. While the device identifier stored by the LBS server 130 in the device identifier store 305 uniquely identifies a mobile device 140, the third-party service provider 140 locally maintains user identifiers describing different users who receive content from the third-party service provider 140. Because the third-party service provider 140 identifies individual users receiving content while the LBS platform server 130 identifies individual mobile devices 110 whose location is tracked, the third-party service provider 140 cannot use the device to obtain location data from the LBS server 130.

To communicate device location data to a third-party service provider 140, the LBS server includes a device-provider association table 320 mapping mobile device identifiers to provider identifiers. In an embodiment, the device-provider association table 320 also uses data from the third-party service provider 140, such as user identifier or other user data, to identify a mobile device 110 associated with a user of the third-party service provider 140. For example, the device-provider association table 320 associates a device identifier with a combination of a provider identifier and a user identifier from the third-party service provider 140. This enables the device-provider association table 320 to map a mobile device 110 to a particular user of the third-party service provider 140. In an embodiment, the device-provider association table 320 comprises a lookup table associating a device identifier with a provider identifier or associating a device identifier with a combination of provider identifier and user-specific data, such as a login, key, email address or other data used by the third-party service provider 140 to uniquely identify users. Additionally, the device-provider association table 320 may include permissions associated with different device identifiers limiting the data associated with a mobile device 110 that may be communicated to a third-party service provider 140.

To simplify exchange of mobile device 110 location data with a third-party service provider 140, the application programming interface (API) store 330 includes predefined APIs for providing subsets of data to the third-party service provider 140. In one embodiment, the third-party service server 330 includes a push API and a pull API. If the push API is used, the LBS platform server 130 transmits updated location information to a third-party service provider 140 when new geographic location data is received from a location data collection client 225 running on a mobile device 110. This allows the LBS platform server 130 to push updated location data to the third-party service provider 140 as a mobile device 110 changes location. In an embodiment, the location data communicated to the third-party service provider 140 is regulated by device-specific settings, such as permissions associated with a device identifier included in the device-provider association table 320.

For example, a permission associated with a device identifier specifies whether the location of the corresponding mobile device 110 is communicated to the third-party service provider 140 as latitude and longitude coordinates, street names, city name, county name or country name. Permissions associated with a device identifier also allow a user of the mobile device 110 to identify third-party service providers 140 are able to receive location information associated with the mobile device 140, allowing the user to regulate access to the location information. Additionally, a permission allows a user of the mobile device 110 to identify the granularity of the location information communicated to a third-party service provider 140. For example, a permission allows a third-party service provider 140 to receive latitude and longitude coordinates associated with the mobile device 110, while another permission allows a different third-party service provider 140 to merely receive data indicating the city where the mobile device 110 is located. An additional permission may allow a user to regulate the length of time that location data is communicated to a third-party service provider 140.

By pushing updated location data to a third-party service provider 140, an API allows the third-party service provider 140 to automatically provide content or applications when a mobile device 110 is near a specified location or other mobile device 110. In an embodiment, the push API may receive parameters from a third-party service provider 140 to transmit geographic location to the third-party service provider 140 when the parameters are satisfied, reducing the amount of communication between the LBS platform server 130 and the third-party service provider 140. For example, the push API communicates an update or notification message to the third-party service provider 140 when the mobile device 110 is within a predefined radius of an entity, such as another mobile device 110 or a specific location. As another example, the push API communicates a notification message to a third-party service provider 140 when the location of a mobile device 110 exceeds a threshold or when the location of the mobile device 110 changes at more than a predefined rate.

The pull API transmits the geographic location of a mobile device 110 responsive to the LBS platform server 130 receiving a request from a third-party service provider 140. The third-party service server 330 allows the third-party service provider 140 to determine the location of a mobile device 110 and provide content to the mobile device 110 customized to the geographic location of the mobile device 110. For example, the pull API allows a third-party service provider 140 to retrieve latitude and longitude coordinates of a mobile device 110 the method used to calculated the latitude and longitude of the mobile device 110 (e.g., GPS data, cell tower identification, wireless access point identification, etc.), a timestamp specifying when the latitude and longitude coordinates were calculated and/or geocoded data, such as a street address, associated with the latitude and longitude coordinates from the LBS platform server. As another example, the pull API allows a third-party service provider 140 to retrieve data from the LBS platform server 130 describing locations the mobile device 110 had previously accessed within a specified time interval, allowing the third-party service provider 110 to generate a history of mobile device 110 locations. As another example, the pull API allows the third-party service provider 140 to determine the current location of a mobile device 110 and identify locations or other mobile devices 110 within a specified radius of the current location of the mobile device 110.

In addition to the third-party service server 330, the LBS platform server includes an API generator 340 which allows a third-party service provider 140 to generate customized rules or parameters for receiving location data associated with a mobile device 110. While the Third-party service server 330 includes predefined APIs for performing predefined functions and returning predefined data, the API generator 340 allows a third-party service provider 140 to customize when location data is communicated from the LBS platform server 130 to the third-party service provider 140. Additionally, the API generator 340 allows a third-party service provider 140 to customize the format in which data is communicated to the third-party service provider 140. For example, the API generator 340 specifies that a street address describing the location of the third-party service provider 140 is transmitted to the third-party service provider 140.

The internal location database 350 comprises a persistent storage device, or combination of a persistent storage device and a non-persistent storage device, storing data received from location data collection clients 225 running on mobile devices 110 and stores data describing geographic location of the mobile devices 110. In one embodiment, the internal location database 350 stores latitude and longitude coordinates extracted from a GPS module 270 of a mobile device 110. Data in the internal location database 350 describing geographic location of a mobile device 110 is associated with a device identifier from the device identifier store 350 to create a pairing of device identifier and geographic location of the mobile device 110 associated with the device identifier.

However, because the location data collection client 225 extracts different types of data from a mobile device 110 for determining geographic position, data from the location data collection client 225 may be converted into latitude and longitude coordinates of the mobile device 110. For example, the location data collection client 225 extracts data identifying a wireless access point or cell tower geographically near the mobile device 110. The location calculator 360 converts received data into latitude and longitude coordinates using a variety of methods. For example, the location calculator 360 includes and retrieves the latitude and longitude coordinates of the cell tower or wireless access point received from the mobile device 110. In one embodiment, the location calculator 360 locally stores latitude and longitude coordinates associated with cell towers or wireless access points. Alternatively, the location calculator 360 transmits data to an external location database 135 which determines latitude and longitude coordinates and transmits the latitude and longitude coordinates to the location calculator 360.

Providing Location Based Services

Figure 4:
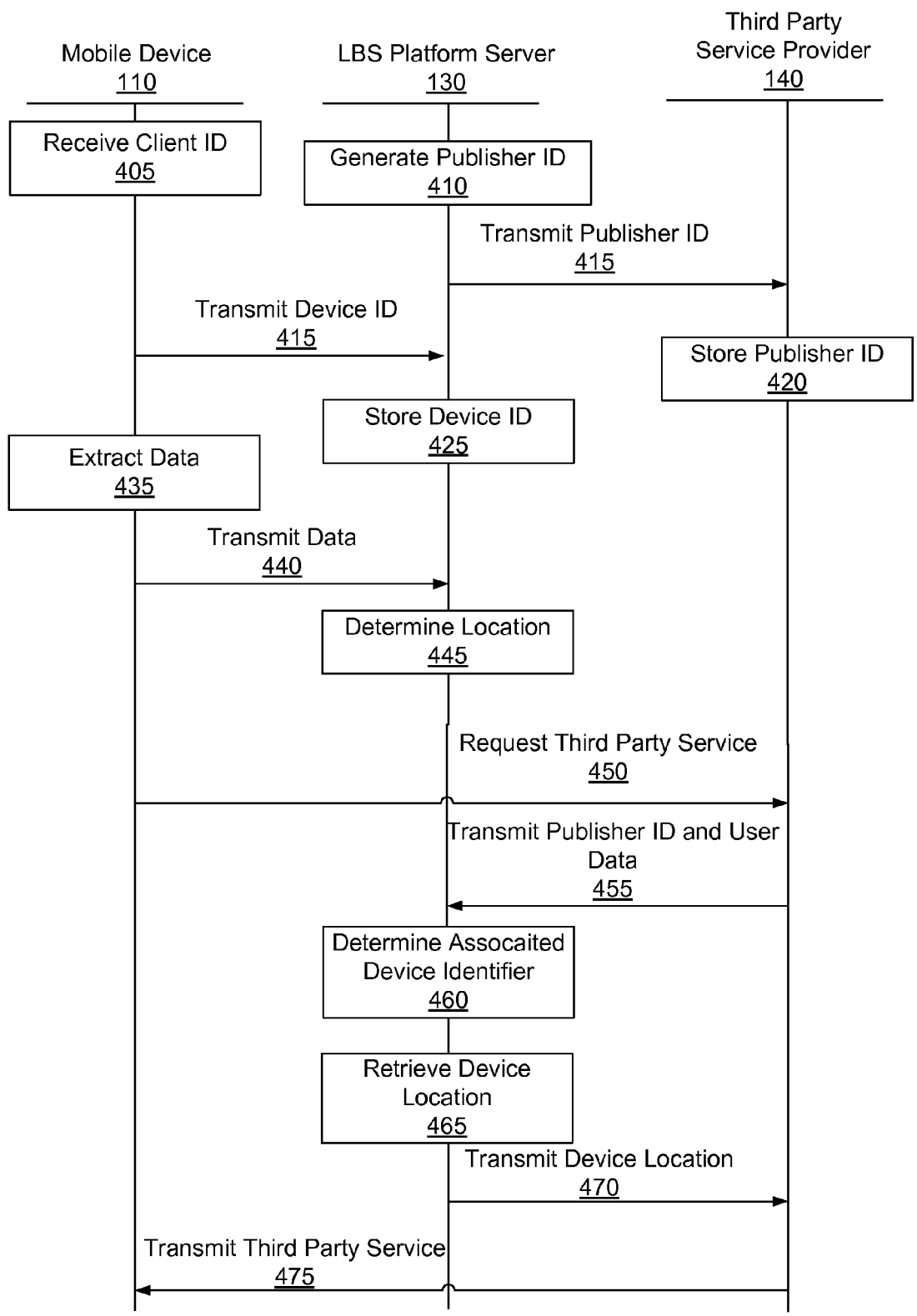
FIG. 4 is an event diagram of a third-party service provider generating location-based content in accordance with an embodiment of the invention.

FIG. 4 shows an event diagram of an example process for a third-party service provider 140 to generating location-based content using data from a location based services (LBS) platform server 130. The actions described in FIG. 4 can be implemented by various computer systems executing instructions that cause the described actions. Those of skill in the art will recognize that one or more of the actions may be implemented in embodiments of hardware and/or software or combinations thereof. For example, instructions for performing the described actions are embodied or stored within a computer readable storage medium. Other embodiments can include different and/or additional steps than the ones described here.

When the location data collection client 225 is installed on a mobile device 110 or when the location data collection client 225 is used for the first time on a mobile device 110, a client identifier is generated 405 by server and received 405 by the location data collection client 225 running on the mobile device 110. The client identifier uniquely identifies the location data collection client 225 running on the mobile device 110. The location collection client 225 then extracts a mobile device identifier from the mobile device 110, such as an electronic serial number or international mobile equipment identity number. The location collection client 225 then combines the mobile device identifier and the client identifier to generate a device identifier which is transmitted 415 from the mobile device 110 to the LBS platform server 130, where it is stored 425 in the device identifier store 305. Storing 425 the device identifier allows the LBS platform server 130 to subsequently identify the mobile device 110 running the location data collection client 225.

When a third-party service provider 140 requests access to the LBS platform server 130, a publisher identifier uniquely identifying the third-party service provider 140 is generated by the LBS platform server 130, stored in the publisher identifier store 310 and transmitted 415 to the third-party service provider 140. The third-party service provider 140 stores 420 the publisher identifier for later access to the LBS platform server 140. This allows the LBS platform server 130 to locally store device identifiers and publisher identifiers which uniquely identify mobile devices 110 and third-party service providers 140, respectively, communicating with the LBS platform server 130.

After transmitting 415 the device identifier, the location data collection client 225 extracts 435 data from the mobile device 110. For example, the location data collection client extracts 435 latitude and longitude coordinates from a GPS module 270 of the mobile device 110, extracts 435 data identifying a cell tower geographically near the mobile device 110 or extracts 435 data identifying a wireless access point geographically near the mobile device 110. However, these are merely examples of data extracted 435 by the location data collection client 225, and any data suitable for determining a location associated with the mobile device 110 may be extracted 435. Additionally, the location data collection client 225 may also extract 435 data associated with the mobile device 110, such as the device type, a timestamp identifying the time at which data was extracted or other data.

The extracted data is transmitted 440 to the LBS platform server 130 which uses the extracted data to determine 445 the location of the mobile device 110 and associated the determined location with the stored device identifier. For example, the LBS platform server 130 uses a location calculator 360 to determine the latitude and longitude coordinates of a cell tower or wireless access point identified by the extracted data. In one embodiment, the extracted data is transmitted 440 to the LBS platform server at a predetermined frequency, such as every five minutes. Alternatively, the location data collection client 225 modifies the frequency at which the extracted data is transmitted 440 based on characteristics of the mobile device 110, such as network usage or power supply 250 life. An example of modification of the transmission frequency is further described below in conjunction with FIG. 6.

The LBS platform server 130 then stores the determined location of the mobile device 110 in the internal location database 350, which associates the determined location with the device identifier. This allows the LBS platform server 130 to locally maintain record of the location associated with a device identifier. The mobile device location data stored in the internal location database 350 and associated with a device identifier may be accessed by the third-party application provider 140 for generation of content customized to the location of the mobile device 110.

For example, when a mobile device 110 requests 450 a service, such as an application or other content, from the third-party service provider 140, the third-party service provider 140 obtains location information associated with the mobile device 110 from the LBS platform server 130. The third-party service may be requested 450 by a mobile device user subscribing to the third-party service provider 140 or installing an application from the third-party service provider 140. In one embodiment, when the third-party service is requested, a mobile device user provides a user identifier, such as a username or email address, allowing the third-party service provider 140 to uniquely identify the mobile device user.

The third-party service provider 140 transmits 455 the publisher identifier of the third-party service provider 140 and the user identifier to the LBS platform server 130, which determines 460 the device identifier associated with the transmitted publisher identifier and user identifier. Using the device-provider association table 320 to correlate a device identifier with a provider identifier and user identifier pair allows the third-party service provider 140 to obtain location data from the LBS platform server 130 without accessing the mobile device 110. This increases the privacy of the mobile device 110.

After determining 460 the device identifier associated with the provider identifier and user identifier from the device-provider association table 320, location data associated with the determined device identifier is retrieved 465 from the internal location database 350. The location data associated with the determined device identifier is transmitted 470 from the LBS platform server 130 to the third-party service provider 140. In an embodiment, the Third-party service server 330 and/or the API generator 340 specifies the format in which the location data is transmitted 470 to the third-party service provider 140. For example, the API generator 340 specifies when location data is transmitted from the LBS platform server 130 to a third-party service provider 140.

After receiving the location data, the third-party service provider 140 uses the location data to provide the requested service. For example, the third-party service provider 140 uses the location data to generate content, such as notifications, updates or coupons, associated with the device location. The third-party service is then transmitted 475 from the third-party service provider 140 to the mobile device 110. Various formats, such as text messages, email messages, web page updates or any other suitable format, may be used to transmit 475 the location data to the third-party service provider 140. Hence, the LBS platform server 130 and location data collection client 225 determine the geographic location of a mobile device 110, and the LBS platform server 130 allows a third-party service provider 140 to access the geographic location of the mobile device 110 without directly accessing the mobile device 110. This enables the third-party service provider 140 to incorporate geographic location specific features into its services while preserving the privacy of mobile device users by using the LBS platform server 130, rather than the mobile device 110, to disseminate location information.

Figure 5:
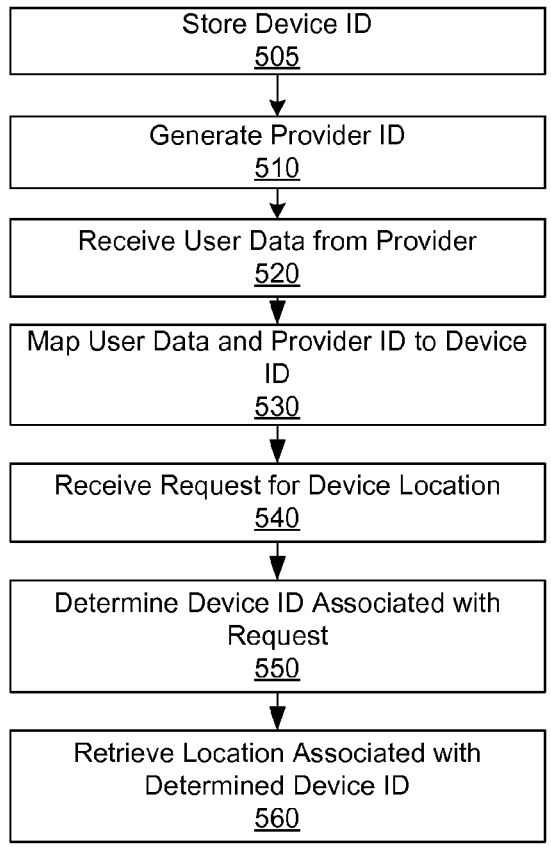
FIG. 5 is a flow chart of a method for providing location information about a mobile device in accordance with an embodiment of the invention.

FIG. 5 is a flow chart of one embodiment of method for a LBS platform server 130 providing location information about a location of a mobile device 110. The actions described in FIG. 5 can be implemented by a processor executing instructions that cause the described actions. Those of skill in the art will recognize that one or more of the actions may be implemented in embodiments of hardware and/or software or combinations thereof. For example, instructions for performing the described actions are embodied or stored within a computer readable storage medium. Other embodiments can include different and/or additional steps than the ones described here.

The LBS platform server 130 stores 505 a device identifier received from a mobile device 110 running the location data collection client 225 in the device identifier store 305. The device identifier comprises a combination of a client identifier generated by the LBS platform server 130 when the location data collection client 225 is installed or first run on the mobile device 110 and a mobile device identifier, such as an ESN or IMEI number, extracted from the mobile device 110 by the location data collection client 225. The device identifier uniquely identifies the mobile device 110 running the location data collection client 225. To allow a third-party provider 140 to access stored location data, the LBS platform server generates 510 and stores a provider identifier, which uniquely identifies a third-party provider 140, in the provider identifier store 310. The provider identifier is also transmitted from the LBS platform server 130 to the third-party service provider 140, so that subsequent communications between LBS platform server and third-party service provider include the provider identifier.

As the third-party service provider 140 allocates content, applications or other services on a per-user basis rather than a per-device basis, the third-party service provider 140 maintains user data, such as user identifiers, such as login name, email addresses or any other identifier that uniquely identifies a user. The user data and provider identifier is received 520 by the LBS platform server 130 to identify users of the third-party service provider 140. However, the LBS platform server 130 stores location information for different mobile devices 110 rather than for individual users. Accordingly, the device-provider association table 320 maps 530 a stored device identifier to the received user data and provider data. This allows the device-provider association table 320 to identify a mobile device 110, using the device identifier, corresponding to a user of the third-party service 140.

When the LBS platform server 130 receives 540 a request from the third-party service provider 140, including the provider identifier and user data, for a location of a third-party service provider user, the LBS platform server determines 550 the device identifier associated with the provider identifier and user data included in the request using the device-provider association table 320. Location data associated with the determined device identifier is then retrieved 560 from the internal location database 350 and communicated to the third-party service provider 140 according to an API included in the Third-party service server 330 or the API generator 340.

Updating Mobile Device Location

FIG. 6 is a flow chart of an example method for updating data describing the geographic location of a mobile device 110. The actions described in FIG. 6 can be implemented by a processor executing instructions that cause the described actions. Those of skill in the art will recognize that one or more of the actions may be implemented in embodiments of hardware and/or software or combinations thereof. For example, instructions for performing the described actions are embodied or stored within a computer readable storage medium. Other embodiments can include different and/or additional steps than the ones described here.

After initial installation and upon activation, a location data collection client 225 extracts data from the mobile device 110, such as latitude and longitude coordinates from a GPS module 270, a location API on the mobile device 110 or identifiers associated with wireless access points or cell towers accessed by a communication module 260. At least a portion of the extracted data may be used to identify or calculation the geographic location of the mobile device 110. The extracted data is transmitted 605 from the mobile device 110 to a location based services (LBS) platform server 130 at a defined frequency, such as every five minutes. To conserve mobile device resources, such as allocated bandwidth or power supply life, the transmission frequency may be modified based on characteristics of the mobile device 110.

While the location data collection client 225 is running, the extracted data is used to determine 610 whether the mobile device 110 is stationary. The mobile device 110 is determined 610 to be stationary if the location of the mobile device has not changed during the prior three transmission periods. For example, if the mobile device 110 remains in the same location for twenty minutes and the transmission frequency is five minutes, the mobile device is considered to be stationary.

Responsive to determining 610 the mobile device 110 is stationary, the data transmission frequency is decreased 650. For example, the transmission frequency is decreased 650 so the extracted data is transmitted one hour later. The transmission frequency may be further decreased 650 if the mobile device 110 remains stationary. For example, if the mobile device 110 is still stationary after an hour, the extracted data is transmitted again after two hours and if the mobile device 110 again remains stationary, the transmission frequency is further decreased 650 so the extracted data is transmitted at four hour intervals. However, when the extracted data changes, indicating that the mobile device 110 has changed position, the transmission frequency is increased to its original defined value.

Responsive to determining 610 the mobile device 110 is not stationary, the location data collection client 225 continues to transmit 620 data according to the defined transmission frequency. The power of the mobile device 110 is also determined 630, and the data transmission frequency is modified 640 according to the determined power, allowing the data transmission frequency to be automatically decreased to conserve power. For example, if the mobile device power is determined 630 to be less than or equal to half of its full capacity, the data transmission frequency is decreased (e.g., data is transmitted at 10 minute intervals rather than 5 minute intervals). This allows the location data collection client 225 to modify data transmission to allow for accurate determination of current mobile device 110 location while efficiently using mobile device resources.

SUMMARY

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium, which include any type of tangible media suitable for storing electronic instructions, and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A system for providing location based services, the system comprising:
    a client application comprising computer program code stored on a computer readable medium and configured to be executed by a processor of a mobile device to cause the mobile device to perform a process comprising:
        obtaining location data from the mobile device, the location data related to a current location of the mobile device, and
        communicating the location information and an identifier for the mobile device over a network used by the mobile device; and
    a location based services (LBS) platform server configured to communicate with one or more mobile devices executing the client application via the network, the LBS platform server comprising:
        a device identifier store maintaining a plurality of device identifiers, each device identifier uniquely identifying one of the mobile devices, the device identifier store configured to identify a mobile device using a received device identifier,
        a location calculator configured to determine the location of a mobile device using location data provided by the mobile device,
        a location database containing the location determined by the location calculator for the mobile devices, each determined location associated with the identifier of the corresponding mobile device,
        a device-provider association table configured to:
            receive a request from a third-party service provider, the request including a provider identifier uniquely identifying the third-party service provider and user-specific data uniquely identifying a user of the third-party service provider; and
            map the received provider identifier and the received user-specific data to a device identifier associated with a mobile device corresponding to the user of the third-party service provider; and
        a third-party services server configured to receive a device identifier from the device-provider association table and access the location database to provide location information for the mobile device associated with the received device identifier to the third-party service provider.

2. The system of claim 1, wherein the location data obtained from the mobile device is obtained by extracting directly from the mobile device global positioning system (GPS) data identifying latitude and longitude coordinates associated with the mobile device.

3. The system of claim 1, wherein the location data obtained from the mobile device comprises data identifying a wireless access point accessed by the mobile device.

4. The system of claim 3, wherein the location calculator is configured to determine the location of a mobile device using location data provided by the mobile device by:
    accessing a location database that associates a plurality of fixed wireless access points with locations of the wireless access points to determine the location of the wireless access point identified by the obtained location data.

5. The system of claim 1, wherein the location data obtained from the mobile device comprises data identifying a cell tower accessed by the mobile device.

6. The system of claim 5, wherein the location calculator is configured to determine the location of a mobile device using location data provided by the mobile device by:
accessing a location database that associates a plurality of cell towers with locations of the cell towers to determine the location of the cell tower identified by with the obtained location data.

7. The system of claim 1, wherein the device-provider association table comprises a table associating each device identifier with a provider identifier, and further associating each device identifier with user-specific data.

8. The system of claim 1, wherein the location calculator receives additional location data from an external source and uses the additional location data to determine the location of the mobile device.

9. A method for providing location based services from a location based services (LBS) platform server, the method comprising:
communicating over a subscriber network with a client application executing on a mobile device, the mobile device corresponding to a user of a third-party service provider;
receiving location data and a device identifier from the client application on the mobile device, the location data obtained from the mobile device by the client application and related to a current location of the mobile device;
identifying the mobile device using the received device identifier by accessing a device identifier store that maintains an identifier for a plurality of mobile devices;
determining the location of the mobile device using the received location data for the mobile device;
storing the determined location of the mobile device in a location database, the determined location stored in association with the device identifier;
receiving a request from the third-party service provider for location information for the user of the third-party service provider, the request including a provider identifier uniquely identifying the third-party service provider and user-specific data uniquely identifying the user of the third-party service provider;
responsive to the request, accessing a device-provider association table to map the received provider identifier and the received user-specific data to the device identifier of the mobile device corresponding to the user of the third-party service provider;
accessing the location database to retrieve location information associated with the device identifier; and
providing the retrieved location information to the third-party service provider.

10. The method of claim 9, wherein the location data comprises global positioning system (GPS) data identifying latitude and longitude coordinates associated with the mobile device extracted directly from the mobile device.

11. The method of claim 9, wherein the location data obtained from the mobile device comprises data identifying a wireless access point accessed by the mobile device.

12. The method of claim 11, wherein determining the location of the mobile device using the received location data comprises:
accessing a location database that associates a plurality of fixed wireless access points with locations of the wireless access points to determine the location of the wireless access point identified by the obtained location data.

13. The method of claim 9, wherein the location data obtained from the mobile device comprises data identifying a cell tower accessed by the mobile device.

14. The method of claim 13, wherein determining the location of the mobile device using the received location data comprises:
accessing a location database that associates a plurality of cell towers with locations of the cell towers to determine the location of the cell tower identified by with the obtained location data.

15. The method of claim 9, wherein the device-provider association table comprises a table associating the device identifier with the provider identifier, and further associating the device identifier with the user-specific data.

* * * * *